Aug. 25, 1959 H. A. SCHULTZE 2,900,810
CONSTANT ANGULAR VELOCITY JOINT
Filed Dec. 18, 1957 2 Sheets-Sheet 1

INVENTOR.
HELMUTH A. SCHULTZE
BY
John P. Murphy
ATTORNEY

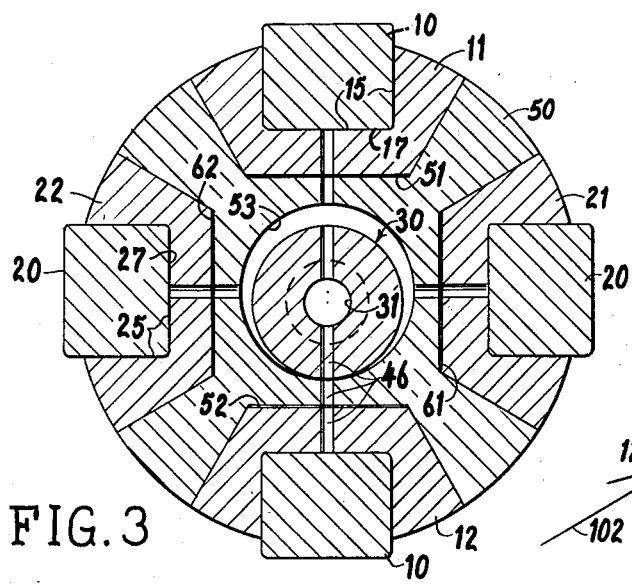

United States Patent Office 2,900,810
Patented Aug. 25, 1959

2,900,810

CONSTANT ANGULAR VELOCITY JOINT

Helmuth A. Schultze, Syracuse, N.Y.

Application December 18, 1957, Serial No. 703,616

5 Claims. (Cl. 64—21)

This invention relates to a universal joint, and more particularly to a constant velocity universal joint wherein uniform motion is imparted to a driven shaft by a driving shaft disposed at an angle to the driven shaft.

Heretofore, universal joints of the constant velocity type have been presented which possess certain disadvantages. Several types are of the rolling member type, depending on hardened steel ball rollers, or other type rollers, disposed in machined races. One disadvantage of this type joint is that considerable expense is involved in machining the component parts of the joint. Another disadvantage is that the rollers each contact the adjacent parts of the joint at a very small area, so small as to be described as a point of contact. In the operation of this type joint, the loading of the components takes place at these small points of contact, thus placing an extreme amount of force at a small point, and thus causing damage to the joint in a relatively short time. Another type uses a ball-shaped housing around the components of the joint. This housing is formed from two primary members which are adapted to slide, one over the other, whereby considerable wearing of the two members is the result. Still another type joint uses two or more knuckle members for transmitting motion of one shaft to another in angular relationship. The loading of one knuckle member by the other is done in constant sliding relationship of one knuckle against the other. Furthermore, one knuckle is constantly placed in a condition of "shear" by the other, wherein the driving knuckle constantly tries to shear the driven knuckle apart. It is thus seen that in the previous types of universal joints of the constant angular velocity type, loading is either confined to an extremely small area, or is done by sliding motion, or by shearing action, or by a combination of any of the above.

It is therefore a prime object of this invention to provide a constant velocity universal joint having a constant bearing surface thus providing for more equal load distribution to the component parts of the joint.

It is a further object to provide a constant velocity universal joint in which the components or units are subjected to constant unit pressure.

It is a further object of this invention to provide a constant velocity universal joint formed from materials possessing characteristics which are particularly well suited to the load-bearing and other requirements of the several components of the joint.

Another object of this invention is to provide a constant velocity universal point which, when assembled, is completely self-centering and self-supporting.

It is another object to construct a universal joint of the above type which is relatively inexpensive to manufacture in that certain complicated operations are obviated in the manufacture of the joint.

In carrying out the above objects, a constant angular velocity universal joint is provided which is adapted to be used in any application wherein one shaft rotatably drives a driven shaft at an angle to the first shaft, and wherein the angle between the shafts may be varied at any time whether the shafts are turning or are at rest. The joint provides for means for turning a driven shaft at an angle to a driving shaft at constant velocity, wherein the means comprises a pair of shaft sections and cooperating bearings slidably engaged with the shaft sections and a bearing support member carrying the bearings, and a centering means between the shafts for maintaining the shafts in angular alignment at all times.

The manner in which the invention is carried out may be best understood from the following description, with reference taken to the accompanying drawings, in which:

Figure 3 is a transverse cross section taken on line 3—3 in Figure 1.

Figure 4 is a transverse elevation of a portion of the universal joint.

Figure 5 is a plan view of a socket bearing.

Figure 6 is a schematic of the angular relationships of the components.

Figure 7 is a top view of the bearing support.

Figure 1:
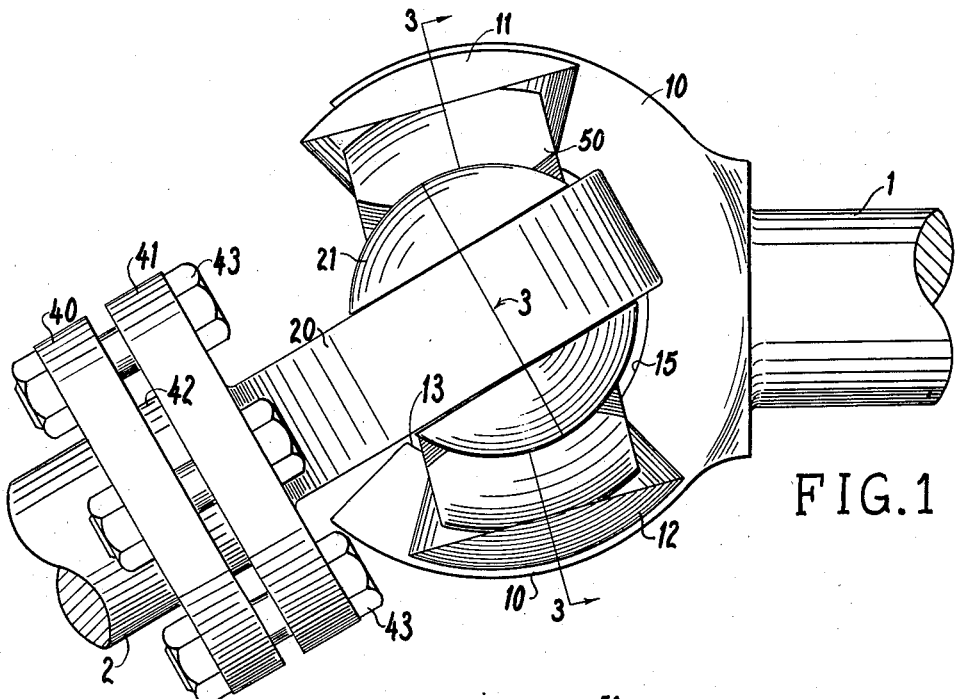
Figure 1 is an elevation of a constant velocity universal joint.

With reference to Figure 1, a driving shaft section is shown designated by the numeral 1, and a driven shaft section designated at 2. The driving shaft 1 has a bifurcated end shaped so as to form a fork or yoke 10 having a circular inner bearing surface 15. The driven shaft 2 has a similar bifurcated end forming a fork or yoke 20. This fork 20 also has a circular inner bearing surface as does fork 10, which surface is not shown.

Shaft 2 is formed with a flange 40 on the end thereof. The fork 20 has a similar mating flange 41. Each shaft is drilled at several points to receive bolts 43, or the like, for fastening the yoke 20 to the shaft 2, as will be fully explained.

The two shafts 1 and 2 are disposed, for illustration, at an angle, with the common center of each fork at point 3. Shaft 1, for purposes of illustration will be considered to be the driving shaft, and shaft 2 the driven shaft; it being the condition that the driven shaft lie at an angle to the driving shaft.

Figure 2:
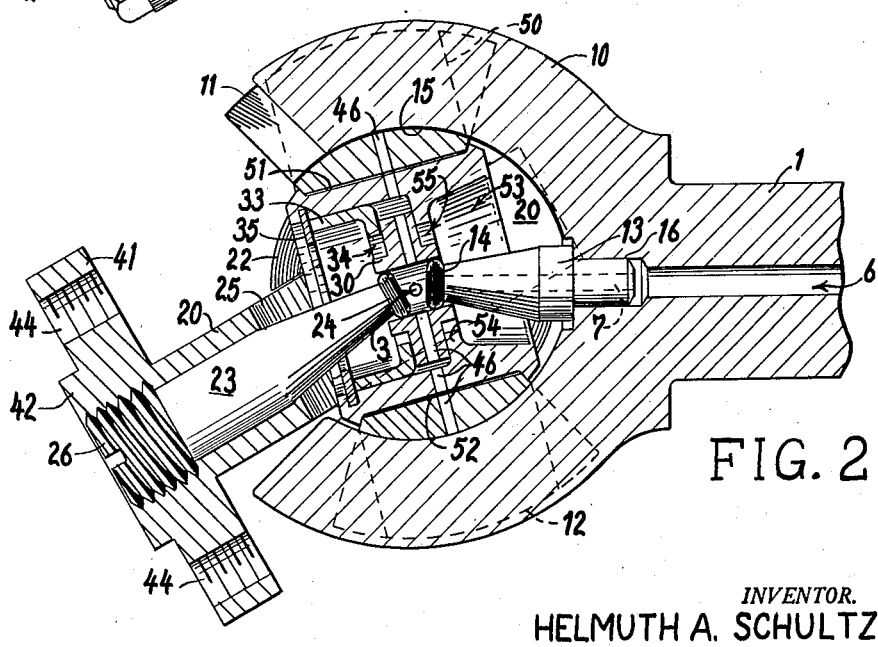
Figure 2 is a longitudinal cross section of the universal joint.

Figures 2, 3 and 4 illustrate the manner in which the two forks 10 and 20 are operatively connected. The two ends of fork 10 are each disposed slidably in a cooperating bearing 11 and 12; and the two ends of fork 20 are each disposed in like manner in a cooperating bearing 21 and 22. Bearings 11 and 12 have a bearing surface 17 which mates with and is engaged with the bearing surface 15 on fork 10. In the same manner, the bearings 11 and 12 have a bearing surface 27 which mates with and is engaged with the bearing surface 25 of fork 20.

Figure 5, along with Figures 2 and 3, more clearly illustrates any bearing 11. The bearing is conical in shape, having a flat bottom area forming a bearing surface 51, and a convex bearing surface 17 which is engaged with bearing surface 15 of the fork. The surface 17 is convex in one plane only, thus adapting the fork to slide thereacross in a circular path.

A bearing support member 50 is substantially cross-shaped, and is adapted to receive and support the cone-shaped bearings in the socket-like areas having a bearing surface 51, 52 for bearings 11 and 12 respectively, and surface 61, 62 for bearings 21 and 22 respectively. Thus, the four cone-shaped socket bearings are adapted to be supported or otherwise positioned at 90° intervals with respect to each other. A main central hole 53 is formed transversely through the body of the bearing support 50. Into this opening 53 is extended a flange-like protuberance 54, Figures 2 and 4, having a center hole 55 therethrough of smaller diameter than the main center hole 53. This will be fully described.

With reference now to Figure 6, it will be seen that a schematic diagram illustrates the angular relationships of the components of the universal joint. Line 101 represents shaft 1, and line 102 represents shaft 2. Each shaft must meet at a common point 103, and thus form an angle between the two shafts. Line 150 bisects the included angle between the two shafts, and further represents the bearing support 50. For the universal joint to operate, the bearing support must bisect the angle between the two shafts at all times. Thus, there must be provided a centering means for maintaining the shafts 101 and 102 in alignment with point 103, and for maintaining the bearing support 150 in position so as to bisect the included angle between the shafts at all times. Diagrammatically, the centering means is represented in Figure 6 by line 130, intersecting lines 101 and 102 at points 113 and 123 respectively. Line 130 also lies at a right angle to, or otherwise is perpendicular to line 150. Thus, if a centering means 130 is adapted to maintain the end 113 of shaft 101 and the end 123 of shaft 102 equidistant from point 103 at all times, and always remain in a position perpendicular to the bearing support 150; the two shafts will always be maintained in alignment with respect to point 103, and the bearing support 150 will always bisect the included angle between the two shafts.

Reference may be had to Figures 2 to 4, wherein the centering means is illustrated. A pin 13 is press-fitted into the end of shaft 1 at point 16, being a drilled hole in the end of the shaft 1. Pin 13 has an enlarged head 14 on the end thereof. Shaft 2 has a pin 23 fastened into the flange 41 on the end thereof by means of threads 26, or other suitable fastening means. The pin 23 has an enlarged head portion 24 similar to the head 14 of pin 13. A centering disc 30 is disposed along the longitudinal center line (not shown) of the bearing support 50. Disc 30 has the shape of a round, flat disc with a thicker center portion forming a hub-like protuberance on each side of the disc. This hub is designated by the numeral 32, Figure 4. The disc 30 is disposed in the main center hole 53 of the bearing support 50, with one of the hubs 32 disposed through the smaller center hole 55 formed by flange 54. The disc is adapted to be retained in this position by the cup-shaped retainer disc or ring 33, which is maintained in position in the main center hole 53 by means of a suitable snap-ring retaining means 35. The snap-ring is disposed in a suitable groove in the body of the support 50 in any conventional manner.

The cup-shaped retaining disc 33 has a center hole 34 of the same diameter as the center hole 55 formed by the flange 54. The hub 32 on the other side of the centering disc 30 is adapted to be extended through the hole 34. In Figure 4 it will be seen that the main center hole 53 is larger in diameter than the disc 30, and that the smaller diameter center hole 55 (and the hole 34) are both larger in diameter than the hub 32 of the centering disc. The centering pins 13 and 23, Figure 2, are disposed with their respective head portions 14 and 24 positioned in the center hole 31 in the centering disc 30.

The center point (not shown) of each pin head 14 and 24, corresponds to the points 113 and 123 respectively on the diagram in Figure 6, and the line 130 corresponds to the centering disc 30. It will become obvious to one skilled in the art that, as the shaft 1 rotates, rotating the bearing support, through the socket bearings, and thence rotating shaft 2 in constant angular velocity; the centering disc 30 will revolve on its hubs 32 around the inner center hole 55 of the bearing support 50, with the pin heads 14 and 24 always in position in the hole 31 in the centering disc 30. The hubs 32 of the disc 30 will always lie substantially adjacent the edge of the flange 54 and the cup-disc 33, and in the center holes 55 and 34 formed thereby, at a point bisecting the included angle between shafts 1 and 2. Thus, the centering disc will also be positioned at a point along the longitudinal center of the bearing support 50. Assuming that the "bottom" of the bearing support 50 lies between the shafts and in the smaller angle therebetween, and that the "top" of the support 50 lies between the shafts in the larger angle; it may be further discerned that the centering disc 30 is adapted to always lie in the "bottom" of the center hole 55, Figures 2 to 4. During operation of the universal joint, if the angle of the two shafts were to become reversed, the centering means will merely reverse itself as the angle does. That is to say, when shaft 2 changes its position (Figure 2) to an angle complementary to the angle illustrated, the two centering pins 13 and 23 will slide slightly in the hole 31 in centering disc 30, and the disc will move from the "bottom" illustrated of the bearing support opening 55 to the "top" of the opening 55, as illustrated.

To assemble the joint, two bearings 11 are positioned in their respective bearing sockets. The bearing support 50 with bearings 11 in place, is cocked to the extreme angle (not shown) possible, and placed between the ends of the fork 10, so that the surfaces 15 of the fork mate with the surfaces 17 of the bearings 11. This accomplished, the bearing support is rotated to a substantially "normal" position between the forks. It is understood that pin 13 is in place in shaft 1 prior to placing the support 50 in position, and that the centering disc 30 is retained in position in the bearing support 50. This done, the head 14 of pin 13 will automatically be in position in hole 31.

To place fork 20 in position, pin 23 is removed from the fork by means of the screw-thread fastening means 26. The bearing support is turned sideways to the maximum angle possible in the fork 10, and bearings 21 and 22 are placed in their respective sockets in the support 50. The fork 20 is then placed in position in the same manner as fork 10. After assembly, the bearing support 50 is returned to a "normal" position, as indicated in the drawings. The pin 23 is then placed through the hole in the fork 20 and fastened securely in position by means of the threads 26. The stub-shaft portion 42 is formed sufficiently long to accommodate the threaded portion 26, and also serves the purpose of aligning the fork 20 and the adjacent shaft 2, Figure 1, along their respective center lines (not shown) when they are assembled by means of the bolts 43 through the flanges 40 and 41. As the pin 23 is placed in the fork 20, the head 24 of the pin enters the hole 31 of the disc 30, thus aligning the two shafts 1 and 2 according to Figure 6.

Shaft 1, or the driving shaft, is provided with a longitudinal center hole or any suitable hole through which oil is adapted to flow for the purpose of lubricating the components of the universal joint. Pin 13 is provided with an oil hole 7 which communicates with the interior of the centering disc 30. There, oil is adapted to flow by centrifugal force through the system of oil holes 46 through the components of the joint. It is understood that the driving shaft is usually in direct communication with the source of lubricating means of the driving means for the shaft. This lubricating means is thence connected to the driving shaft through the oil hole 6. It is thus seen that a means is provided whereby to lubricate the centrifugal joint centrifugally.

In forming the components of the joint, it is desired that, since the loading of the components is substantially all compression loading, the material from which the components are formed have suitable characteristics for this type loading. Hence, the forks or yokes of the shafts will be formed from steel, or other suitable material. The forks, while loaded partially in compression, are also loaded partially in shear. The bearings may be formed from Oilite, a material adapted to retain lubricating oil for the purpose of distributing the oil uniformly across the bearing surfaces. The bearing support may, in the preferred embodiment, be formed from powdered iron, which bears excellent characteristics of compression loading.

The operation of the joint is as follows: The driving shaft 1 is turned on its axis by the power means (not shown). The sides of the fork 10 of shaft 1 bear against their respective bearings 11 and 12. The bearings 11 and 12, being disposed in their respective sockets in the bearing support 50 are adapted to turn the bearing support 50 on its transverse axis at the same speed as the shaft 1. Shaft 2 is similarly connected to the bearing support 50 by means of the respective bearings 21 and 22 on the ends of the fork 20. The turning bearing support 50 bears against the fork 20 of shaft 2 through the bearings 21 and 22 and thus turns shaft 2 on its longitudinal axis. As hereinabove described the centering disc 30, cooperating with the centering pins 13 and 23, will maintain the bearing support 50 so as to bisect the included angle between shafts 1 and 2 at all times. Each bearing is adapted to turn on its axis in its respective bearing socket in the bearing support 50 independently. However, as each pair of bearings is retained by a fork, a pair of bearings is adapted to turn simultaneously. As shaft 1 turns, the bearing support 50 changes its angular position accordingly as it turns shaft 2. As the angular position of the bearing support 50 is changed, the respective pair of bearings for shaft 1 and shaft 2 turn slightly in their bearing sockets so that the slot through the bearings, and on which the fork is disposed, is in alignment at all times with the fork. As shaft 1 turns, oil feeds through the oil hole 6 in the shaft, through oil hole 7 in pin 13, and into the center hole 31 in the centering disc 30. As the disc revolves around the inner hole 55 in the bearing support 50, oil travels through the oil holes 46 in the disc to the oil holes 46 in the bearing support 50, and thence to the oil holes 46 in the bearings. The bearings, being formed from Oilite, or any other suitable material, distribute the oil to all of the bearing surfaces in a uniform manner. A protective covering of any suitable type may be placed around the joint so as to prevent loss of lubricant, and to prevent entry of foreign matter such as dirt and the like into the operating surfaces of the joint.

A modification of the centering disc and bearing support contemplates moving the flange 54 axially towards the edge of the center opening 53. The centering disc 30 is then formed substantially in the form of a washer, and has a longitudinal or axial dimension greater than that illustrated in the present embodiment. This construction allows greater end-play of the two centering pins 13 and 23 in the center hole 31, as the centering disc revolves constantly around the inner hole 55 as the angle of the bearing support varies with the turning of the joint.

A further modification contemplates changing the structure of the bottom surface of the bearings. This surface as now embodied represents a substantially flat surface. It is contemplated to extend a substantially central portion of reduced diameter of this surface axially into a mating hole or bore (not shown) in the bearing support. The advantage of more positive bearing action is the result.

As the joint is turned, the structure of the joint, in addition to the use of a combination of materials for the component parts selected from the groups represented by the materials given herein by way of example, combine to form a constant angular velocity joint which is efficient in operation, resistant to wear, and adapted to transfer loading from one component to another in a new manner.

Equal load distribution is achieved through the use of a constant bearing surface whereby the components are subjected to constant unit pressure. The joint is self-centering through the use of the centering means which is adapted to maintain the shafts in alignment at all times.

A specific embodiment having been shown and described, it is to be understood that the invention is not to be limited to the embodiment illustrated by way of example, but is to be construed as that which falls fairly within the true spirit and scope of the appended claims.

I claim:

1. Means for turning a driven shaft at a constant velocity by a driving shaft; said means comprising a pair of shaft sections, cooperating bearings slidably engaged with each of said shaft sections, and a bearing support member carrying said bearings and forming an operative connection between each of said shaft sections, and centering means cooperating between said shaft sections; each said shaft section having a bifurcated end portion forming a fork having a bearing surface thereon, said cooperating bearings being adapted to operatively receive in pairs thereof, each fork of said shaft sections, said centering means comprising a centering pin fastened in the end of each said shaft section and extending therefrom, and a disc with a hole therethrough disposed in a central opening in said bearing support member at the common point between each of said shaft section, each of said centering pins being adapted to enter the hole in said disc for maintaining said pair of shaft sections in alignment.

2. Means for turning a driven shaft at a constant velocity by a driving shaft; said means comprising a pair of shaft sections, cooperating bearings slidably engaged with each of said shaft sections, a bearing support member carrying said bearings and forming an operative connection between each of said shaft sections, and centering means cooperating between said shaft sections for maintaining said shaft sections in alignment; each said shaft section having a bifurcated end portion forming a fork having a bearing surface thereon, said cooperating bearings operatively receiving in pairs thereof, each fork of said shaft sections.

3. Means for turning a driven shaft at a constant velocity by a driving shaft; said means comprising a pair of shaft sections, cooperating bearings slidably engaged with each of said shaft sections, a bearing support member carrying said bearings and forming an operative connection between each of said shaft sections, and centering means cooperating between said shaft sections for maintaining said shaft sections in alignment; said centering means comprising a centering pin extending from the end of each of said shaft sections, and a disc with a hole therethrough disposed in a central opening in said bearing support member at a common point on the axes of said pair of shaft sections, each of said centering pins entering the hole in said disc for maintaining said pair of shaft sections in alignment.

4. Means for turning a driven shaft at a constant velocity by a driving shaft; said means comprising a pair of shaft sections, cooperating bearings slidably engaged with each of said shaft sections, a bearing support member carrying said bearings and forming an operative connection between each of said shaft sections, and centering means cooperating between said shaft sections; each said shaft section having a bifurcated end portion forming a fork having a bearing surface thereon, said cooperating bearings operatively receiving said forks of said shaft sections; said centering means including a revolvable element disposed in said bearing support member, and a pin extending from each said shaft section and operatively disposed with respect to said revolvable element.

5. Means for turning a driven shaft at a constant velocity by a driving shaft; said means comprising a pair of shaft sections, cooperating bearings slidably engaged with each of said shaft sections, a bearing support member carrying said bearings and forming an operative connection between each of said shaft sections, and centering means cooperating between said shaft sections; each said shaft section having a bifurcated end portion forming a fork having a bearing surface thereon; said cooperating bearings operatively receiving in pairs thereof, each fork of said shaft sections; said centering means comprising a centering pin extending from the end of each shaft section, and a disc with a hole therethrough disposed in a central opening in said bearing support member between each of said shaft sections, each of said centering pins entering the hole in said disc for maintaining said pair of shaft sections in alignment.

References Cited in the file of this patent

UNITED STATES PATENTS

| | | |
|---|---|---|
| 2,293,717 | Dodge | Aug. 25, 1942 |
| 2,342,305 | Seib | Feb. 22, 1944 |
| 2,353,801 | Wingquist | July 18, 1944 |

FOREIGN PATENTS

| | | |
|---|---|---|
| 722,653 | France | Jan. 4, 1932 |